Patented June 1, 1943

2,320,497

UNITED STATES PATENT OFFICE 2,320,497

DERIVATIVES OF TROPIC ACID AMIDE AND MANUFACTURE THEREOF

Wilhelm Wenner, Basel, Switzerland, assignor to Hoffmann-La Roche Inc., Nutley, N. J., a corporation of New Jersey No Drawing. Application June 26, 1939, Serial No. 281,269. In Germany July 7, 1938

3 Claims. (Cl. 260—559)

The need for an effective choleretic has become more and more evident in recent years since it has been established that by increasing the secretion of bile, illnesses of the liver and bile ducts can be favourably influenced. A number of cholagogic preparations have in fact already been placed on the market. The better known among them contain as active substances bile acid derivatives, podophyllin, as well as extracts from plants (e. g. radish extract). Extracts from liver and gall bladder have also been employed as choleretics.

It has now been found that tropic acid amide and its neutral N-substituted derivatives possess a strong cholagogic action.

Only tropic acid amide has been described in the literature up to the present (Annalen der Chemie, vol. 389, year 1912, page 111). This was obtained through the following intermediate stages: Tropic acid, atropic acid, β-bromo-α-phenyl propionic acid. The manufacture of atropic acid as well as of β-bromo-α-phenyl propionic acid does not proceed satisfactorily because the formation of by-products cannot be avoided (Annalen der Chemie, vol. 209, year 1881, page 12, paragraph 4). Likewise, the transformation of β-bromo-α-phenyl propionic acid into tropic acid amide can only be carried out in poor yield, since atropic acid as well as atrolactic acid and styrol occur as by-products (Annalen der Chemie, vol. 115, year 1860, page 159; vol. 209, year 1881, page 11). This process cannot therefore be taken into consideration for the technical synthesis of tropic acid amide.

The disadvantages described can be avoided if tropic acid amide is obtained by allowing ammonia to act on O-acetyl tropic acid chloride. The ammonia may be employed in aqueous solution or in a suitable organic solvent, such as benzene, toluene, ether, chloroform, petroleum ether. O-acetyl tropic acid amide is obtained in very good yield. By treating this compound with acids or alkalis under suitable conditions, the acetyl group is split off.

If amines, e. g., aliphatic and aromatic primary and secondary amines, piperidine and its C-substitution derivatives, aralkyl amines, cycloalkyl amines, are caused to act on O-acetyl tropic acid chloride in the same manner, the corresponding substituted amides of O-acetyl tropic acid are obtained. The amines employed are also best used in solution in water or in an organic solvent. The acetyl group is split off by treatment with alkalis or acids from the resulting O-acetyl tropic acid amides substituted in the amido group.

Tropic acid amide and its neutral N-substituted derivatives are colourless compounds. The lower members of the series are crystalline, the higher members mostly liquids. They are to be employed as choleretics. The examination of the cholagogic action was carried out in accordance with Grabe's process (Archiv für experimentelle Pathologie und Pharmakologie, vol. 176, year 1934, page 673). According to this method the gall secretion in the narcotised rat is first determined over a period of 2 hours, the preparation to be examined then administered by means of a stomach tube, and the ensuing change in the gall secretion observed.

The comparison of tropic acid dimethyl amide with desoxycholic acid, whose choleretic action is described in the literature (Biochemische Zeitschrift, vol. 130, year 1922, page 556; Zeitschrift für die gesamte experimentelle Medizin, vol. 30, year 1922, page 423), clearly shows the superiority of the new class of compounds.

| Preparation | Test No. | Dose mg./kg. | No. of drops of bile per hour— | | Change in per cent of initial value |
|---|---|---|---|---|---|
| | | | Before application of preparation | After application of preparation | |
| Tropic acid dimethyl amide | 1 | 50 | 8 | 13 | +62.5 |
| | 2 | 50 | 12 | 15 | +25 |
| | 3 | 50 | 12 | 16 | +33 |
| | 4 | 50 | 17 | 22 | +30 |
| | 5 | 50 | 18 | 27 | +50 |
| | 6 | 50 | 18 | 32 | +78 |
| | 7 | 50 | 14 | 26 | +86 |
| | 8 | 50 | 16 | 42 | +163 |
| | 9 | 25 | 10 | 18 | +80 |
| | 10 | 25 | 18 | 23 | +28 |
| | 11 | 25 | 13 | 9 | −31 |
| | 12 | 25 | 16 | 23 | +44 |
| Desoxycholic acid | 13 | 50 | 15 | 12 | −20 |
| | 14 | 50 | 15 | 12 | −20 |
| | 15 | 50 | 9 | 11 | +22 |
| | 16 | 50 | 15 | 19 | +27 |
| | 17 | 25 | 9 | 8 | −11 |
| | 18 | 25 | 9 | 10 | +11 |
| | 19 | 25 | 11 | 6 | −45 |
| | 20 | 25 | 19 | 14 | −26 |

Example 1

45 parts by weight of O-acetyl tropic acid chloride (Berichte der Deutschen Chemischen Gesellschaft, vol. 41, year 1908, page 730) are added dropwise to 45 parts by weight of aqueous ammonia (25 per cent) while stirring and keeping the temperature at 10–20° C. by external cooling. The O-acetyl tropic acid amide formed is separated as a solid. It is sucked off and transformed into tropic acid amide by heating with 200 parts by weight of a 4 per cent solution of caustic soda. After recrystallisation from water, tropic acid amide has a melting point of 169° C. The yield amounts to over 70 per cent of the theoretical.

Example 2

45 parts by weight of O-acetyl tropic acid chloride are added dropwise to 56 parts by weight of aqueous ethylamine solution (33 per cent) while stirring, the temperature being kept at 20–30° C. The reaction mixture is extracted with benzene. After evaporation of the benzene, about 35 parts by weight of crude O-acetyl tropic acid ethylamide are obtained. By short heating with a dilute solution of caustic soda the acetyl group is split off and tropic acid ethylamide of melting point 129° C. is obtained. The yield is about 80 per cent of the theoretical.

If allylamine is used instead of ethylamine, the above reaction produces tropic acid allyl amide melting at 140° C.

Example 3

45 parts by weight of O-acetyl tropic acid chloride are added drop by drop to 55 parts by weight of aqueous dimethylamine solution (32 per cent) while stirring and cooling with ice. By extraction with benzene, 44 parts by weight of O-acetyl tropic acid dimethyl amide of melting point 68° C. are obtained. By heating with a 12 per cent solution of caustic soda, the acetyl group is removed and 30 parts by weight of tropic acid dimethyl amide melting at 96° C. are obtained.

Example 4

45 parts by weight of O-acetyl tropic acid chloride are dissolved in 100 parts by weight of chloroform and added dropwise to 30 parts by weight of diethylamine in 100 parts by weight of chloroform while stirring and cooling. The solution is evaporated to dryness and the residue treated with water and benzene. The benzene solution is separated and evaporated to dryness. The residue is left to stand with a mixture of 200 parts by weight of methanol and 40 parts by weight of concentrated hydrochloric acid at room temperature for 2 days. The mixture is then neutralised and evaporated to dryness. Tropic acid diethylamide of melting point 84° C. is obtained.

Example 5

45 parts by weight of O-acetyl tropic acid chloride are dissolved in 120 parts by weight of benzene and added dropwise to a solution of 52 parts by weight of di-n-butylamine in 350 parts by weight of benzene while stirring and cooling. The reaction mixture is extracted with water and the benzene solution evaporated. The acetyl group is split off by the action of aqueous alcoholic alkali. Tropic acid di-n-butylamide is obtained which melts at 61° C.

Example 6

45 parts by weight of O-acetyl tropic acid chloride are added dropwise to a solution of 40 parts by weight of piperidine in 200 parts by weight of benzene while stirring and cooling. The reaction mixture is extracted with water and evaporated to dryness. O-acetyl tropic acid piperidide of melting point 83° C. is obtained. By saponification with aqueous alcoholic alkali, tropic acid piperidide of melting point 102° C. is obtained in a yield of 80 per cent.

Example 7

25 parts by weight of O-acetyl tropic acid chloride are dissolved in 100 parts by weight of benzene and added to a solution of 30 parts by weight of aniline in 100 parts by weight of benzene while stirring and cooling. The reaction mixture is extracted with water. After concentration, 40 parts by weight of O-acetyl tropic acid anilide melting at 131° C. are crystallised from the benzene solution. Saponification in 80 per cent ethyl alcohol with a 10 per cent solution of caustic soda at 70° C. yields tropic acid anilide in a yield of 80 per cent. The anilide crystallises from benzene in needles melting at 145° C.

Example 8

25 parts by weight of O-acetyl tropic acid chloride are dissolved in 100 parts by weight of toluene and the solution added dropwise to a solution of 35 parts by weight of benzylamine in 300 parts by weight of toluene while cooling. After extraction with water and dilute acid, and evaporation of the toluene in vacuo, 41 parts by weight of O-acetyl tropic acid benzylamide of melting point 83° C. remain. The acetyl group is split off by dissolving in 100 parts by weight of alcohol and addition of the calculated quantity of a 20 per cent aqueous solution of caustic soda at about 40° C. Tropic acid benzylamide is isolated by evaporation of the solution or by addition of water. By crystallisation from benzene it is obtained in pure form of melting point 124° C.

Example 9

20 parts by weight of tropic acid are transformed into O-acetyl tropic acid chloride in the usual manner. The O-acetyl tropic acid chloride is dissolved in 100 parts by weight of benzene and the solution added dropwise to a cooled solution of 22 parts by weight of morpholine in 100 parts by weight of benzene while stirring. The mixture is left to stand overnight. It is then extracted with water and dilute hydrochloric acid. The benzene solution is evaporated. The remaining oil is dissolved in 100 parts by weight of alcohol. 36 parts by weight of a 10 per cent solution of caustic soda are added dropwise to the solution while stirring and keeping at moderate temperature. After 2 hours the reaction mixture is acidified and evaporated to dryness. The residue is extracted with boiling benzene. On cooling, tropic acid morpholide crystallises from the concentrated benzene extract. By recrystallisation from benzene petroleum-ether, the compound is obtained in colourless needles melting at 91° C. The yield amounts to about 18 parts by weight.

Example 10

O-acetyl tropic acid chloride, obtained in the usual manner from 25 parts by weight of tropic acid, is dissolved in 100 parts by weight of benzene and the solution added dropwise to a solution of 55 parts by weight of veratrylamine (3,4-dimethoxy benzylamine) in 100 parts by weight of benzene while stirring and cooling. After 3 hours the reaction mixture is diluted with 200 parts by weight of water. The undissolved product (veratrylamine hydrochloride) is sucked off. The filtrate consists of 2 layers. The upper benzene layer is separated and evaporated. O-acetyl tropic acid veratrylamide remains as a crystalline compound melting at 102° C. It is dissolved in alcohol and a 10 per cent solution of caustic soda added until the mixture shows remaining alkaline reaction. After 1 hour the product is acidified and evaporated to dryness in vacuo. The residue is crystallised from dilute alcohol or from benzene. About 30 parts by weight of tropic acid veratrylamide are obtained in colourless needles of melting point 120° C.

I claim:
1. Derivatives of tropic acid amide of the formula

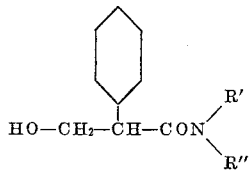

wherein R' is selected from the group consisting of hydrogen and aralkyl, and R'' is an aralkyl group.

2. Tropic acid benzylamide.

3. Process for the manufacture of tropic acid benzylamide, comprising reacting O-acetyl tropic acid chloride with benzylamine and splitting off the acetyl group from the O-acetyl tropic acid benzylamide formed by means of a hydrolising agent.

WILHELM WENNER.